United States Patent
Ackilli et al.

(10) Patent No.: US 10,327,460 B2
(45) Date of Patent: Jun. 25, 2019

(54) STABLE LOW ACID BEVERAGE CONCENTRATE

(71) Applicant: J & H Natural Products LLC, Stamford, CT (US)

(72) Inventors: Joseph Anthony Ackilli, South Salem, NY (US); Harry Topalian, Weston, CT (US)

(*) Notice: Subject to any disclaimer, the term of this patent is extended or adjusted under 35 U.S.C. 154(b) by 187 days.

(21) Appl. No.: 15/366,351

(22) Filed: Dec. 1, 2016

(65) Prior Publication Data

US 2017/0156374 A1   Jun. 8, 2017

Related U.S. Application Data

(60) Provisional application No. 62/386,561, filed on Dec. 7, 2015.

(51) Int. Cl.
| | | |
|---|---|---|
| A23L 2/385 | (2006.01) | |
| A23L 2/56 | (2006.01) | |
| A23L 2/68 | (2006.01) | |
| A23L 2/52 | (2006.01) | |

(52) U.S. Cl.
CPC ............... *A23L 2/385* (2013.01); *A23L 2/52* (2013.01); *A23L 2/56* (2013.01); *A23L 2/68* (2013.01)

(58) Field of Classification Search
None
See application file for complete search history.

(56) References Cited

U.S. PATENT DOCUMENTS

| | | | | |
|---|---|---|---|---|
| 2011/0123677 A1* | 5/2011 | Rivera | ............... | A23L 2/02 426/61 |
| 2013/0040036 A1* | 2/2013 | Zeller | ............... | A23L 2/385 426/590 |

* cited by examiner

*Primary Examiner* — Jenna A Watts
(74) *Attorney, Agent, or Firm* — Polsinelli PC

(57) ABSTRACT

Liquid beverage concentrates are provided that can be cold filled during packaging while maintaining shelf stability for at least one year at ambient conditions. The concentrates are provided containing very low levels of added acid without buffers and with polyols to increase shelf life to at least one year.

7 Claims, No Drawings

STABLE LOW ACID BEVERAGE CONCENTRATE

RELATED APPLICATION

This application claims the benefit of U.S. Provisional Application No. 62/386,561, which is hereby incorporate herein by reference.

BACKGROUND OF THE INVENTION

The present application relates to a highly concentrated beverage compositions having extremely low levels of acid(s) to extend the shelf life of critical components, such as flavors, without the use of buffering agents.

The market for concentrated liquids for flavoring water (i.e., beverage concentrates) has grown to a multimillion dollar industry. Beverage concentrates typically have relatively high acid levels (low pH) in order to provide a sufficiently tart taste when diluted in water. High acidity, however, breaks down flavor components in the concentration, which reduces the shelf life of the concentrate greatly. It continues to be a struggle to develop concentrates having the desired acidity while also exhibiting a sufficient shelf life. Some attempts increase the shelf life of concentrates involve using buffers to soften the high acid content of the concentrate. See, for example, U.S. Pat. Nos. 8,293,299 and 2,764,486. The use of buffers, however, has numerous drawbacks. Accordingly, there is a need for stabilized beverage concentrates that do not use buffers in this regard.

SUMMARY OF THE INVENTION

A beverage concentrate having a pH of about 2.5 to about 3.0 is provided that includes about 1 to about 4% by weight acid; and about 45% to about 70% by weight non-aqueous liquid.

In at least one embodiment, the non-aqueous liquid comprises glycerol.

In at least one embodiment, the non-aqueous liquid comprises propylene glycol.

In at least one embodiment, the concentrate includes about 7% to about 25% water.

In at least one embodiment, the concentrate is dilutable at a ratio of about 1:75 to about 1:160.

In at least one embodiment, the concentrate includes about 6% to about 16% flavoring.

In at least one embodiment, the flavoring is selected from a group consisting of a liquid flavoring, a powdered flavoring, and a combination thereof.

In at least one embodiment, the flavoring comprises a solvent selected from a group consisting of ethanol, propylene glycol, or combinations thereof.

In at least one embodiment, the concentrate includes lemon or lime juice concentrate at levels of about 4% to about 10%.

In at least one embodiment, the acid is selected from a group consisting of citric, malic, adipic, phosphoric, and acetic acids.

In at least one embodiment, the concentrate includes a non-caloric sweetener of about 1% to about 3% selected from a group consisting of stevia, sucralose, acek, and a combination thereof.

In at least one embodiment, the concentrate includes about 1% to about 2% probiotic.

In at least one embodiment, the concentrate has a water activity of about 0.55 to about 0.75.

In at least one embodiment, the concentrate is shelf stable for at least 12 months.

Additional aspects of the present invention will be apparent in view of the description which follows.

DETAILED DESCRIPTION OF THE INVENTION

The present application generally provides liquid beverage concentrates and methods for producing such concentrates with relatively low acid content and pH that are stabilized primarily other than with the use of buffers. In a preferred embodiment, the liquid concentrates described herein eliminate the need for buffers to reduce acidity by minimizing the acid content of the concentrate. This may be achieved with liquid concentrates that include a water activity reducing component, which provides the concentrate with a water activity of about 0.55 to about 0.75. The liquid concentrate can be provided with decreased water content and substantially reduced water activity to about 0.55 to about 0.75 by including in the composition a non-aqueous liquid that is at least about 45% by weight. In a preferred embodiment, the non-aqueous liquid is glycerol, propylene glycol, alone or mixtures thereof.

The liquid beverage concentrates disclosed herein, such as those discussed in Table 2, can be shelf stable for at least 12 months. Such concentrations can preferably be diluted at a ratio of about 1 concentrate to at least about a 75 water, or more preferably at least 100 water, or even more preferably between about 75-160 water. In other words, the concentrate will form 1/75 or less of a ready-to-drink beverage and preferably 1/100 or less of the ready-to-drink beverage. In at least one embodiment, about the ratio of dilution is about 1 concentrate to about 75 to 160 water, and a water activity in the range of about 0.55 up to 0.75.

The concentrates disclosed herein can contain various combinations of ingredients, such as water, flavoring, nutrients, coloring, sweetener, salts, gums, caffeine, stabilizers, and probiotics. The desired pH of the concentrate can be established using any combination of food-grade acid, such as but not limited to citric acid, malic acid, succinic acid, acetic acid, adipic acid, tartaric acid, fumaric acid, phosphoric acid, lactic acid, or any other food grade organic or inorganic acid. Acid selection can be a function of the desired concentrate pH and desired taste of the diluted ready-to-drink product. The pH of the concentrate is preferably between about 1.0 to about 4.0, or more preferably between about 2.0 to about 4.5, or even more preferably between about 2.4 to 3.0.

Methods to make the concentrates are also provided. The method generally includes mixing acid, flavoring, water, sweetener, polyol and fruit juices in the proportions discussed herein. The concentrates can be packaged in an airtight container with or without pasteurization.

Shelf stable or stabilized as used herein means that the concentrate avoids substantial flavor degradation and is microbially stable such that the concentrate has an aerobic plate count (APC) of less than about 5000 CFU/g, yeast and mold at a level less than about 500 CFU/g, and coliforms at 0 MPN/g for at least about one year. Avoiding substantial degradation of the flavor means that there is little or no change in flavor provided by the concentrate to the ready-to-drink beverage after storage at room temperature over the shelf life of the product with little or no development of off flavor notes.

In some embodiments, the concentrate includes a sweetener. Useful sweeteners may include, for example, erythritol, sucralose, aspartame, stevia, saccharine, luo han guo, Rebaudioside A, acesulfame potassium or any other nutritive or non-nutritive sweetener and combinations thereof.

Many additives can be included in the concentrates. Flavors can include, for example, fruits, tea, coffee and the like and combinations thereof. The flavors can be provided in a variety of types of flavorings, including alcohol-containing flavorings (such as ethanol- or propylene glycol-containing flavorings), flavor emulsions, extruded flavorings, and spray-dried flavorings. A variety of commercially available flavorings can be used. Suitable flavors include Cherry, Coconut, Lemon-Lime, Acai, Pomegranate, Pineapple, Strawberry, Lemon, Mango, Cranberry, Raspberry, Green Tea. The flavorings can be included at about 5 to about 20 percent of the concentrate by weight. The precise amount of flavorings included in the concentrate will vary depending on the concentration of the liquid beverage concentrate, the concentration of flavor key in the flavoring, and the desired flavor profile of the resulting ready-to-drink beverage Exemplary recipes for flavorings are provided below in Table 1 below. It is understood that other types of flavorings can be used, if desired, including, for example, nano-emulsions, micro-emulsions, agglomerated flavorings, freeze-dried flavorings, and encapsulated flavorings.

TABLE 1

Flavoring Formulations

| Component | Propylene Glycol Flavorings | Ethanol Containing Flavorings | Flavor Emulsions | Extruded Flavorings | Spray Dried Flavorings |
|---|---|---|---|---|---|
| Flavor Key | 1-20% | 1-20% | 1-10% | 1-30% | 1-30% |
| Water | 0-10% | 0-10% | 70-80% | | |
| Ethanol | | 80-95% | | | |
| Propylene Glycol | 80-95% | | | 0-4% | 0-4% |
| Emulsifier | | | 1-4% | 0.1-10% | |
| Carrier | | | | 1-95% | 1-95% |
| Emulsion Stabilizer | | | 15-20% | | |

TABLE 2

Concentrate Formulations

| Component | (%) Percent by weight | | | | |
|---|---|---|---|---|---|
| Citric Acid | 1-4 | 0 | 1-4 | 0 | 1-4 |
| Malic Acid | 0 | 1-4 | 0 | 1-4 | 0 |
| Glycerol | 45-65 | 45-65 | 45-65 | 45-65 | 55-70 |
| Water | 10-25 | 10-25 | 10-25 | 10-25 | 7-20 |
| Flavoring | 6-12 | 10-16 | 6-12 | 10-16 | 6-12 |
| Lemon Juice Concentrate | 4-10 | — | 0 | 0 | 4-10 |
| Lime Juice Concentrate | — | 4-10 | 0 | 0 | 0 |
| Stevia/Sweetener | 1-3 | 1-3 | 1-3 | 1-3 | 1-3 |
| Ascorbic Acid | 0.1-0.3 | 0.1-0.3 | 0.1-0.3 | 0.1-0.3 | 0.1-0.3 |
| Probiotic/Supplement | 0 | 0 | 0 | 0 | 1.0-2.0 |
| pH | 2.4-3.0 | 2.4-3.0 | 2.4-3.0 | 2.4-3.0 | 2.4-3.0 |

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A shelf stable concentrate having a pH of about 2.5 to about 3.0 and a water activity of about 0.55 to about 0.75 comprising:
   from 1% to 3% by weight acid;
   about 45% to about 70% by weight glycerol;
   about 7% to about 25% water; and
   about 6% to about 16% flavoring; wherein the acid is selected from a group consisting of citric, malic, adipic, phosphoric, and acetic acids.

2. The concentrate of claim 1, comprising lemon or lime juice concentrate at levels of about 4% to about 10%.

3. The concentrate of claim 1, wherein the concentrate is dilutable at a ratio of about 1:75 to about 1:160.

4. The concentrate of claim 1, wherein the flavoring is selected from a group consisting of a liquid flavoring, a powdered flavoring, and a combination thereof.

5. The concentrate of claim 4, wherein the flavoring comprises a solvent selected from a group consisting of ethanol, propylene glycol, or combinations thereof.

6. The concentrate of claim 1, comprising a non-caloric sweetener of about 1% to about 3% selected from a group consisting of stevia, sucralose, acek, and a combination thereof.

7. The concentrate of claim 1, comprising about 1% to about 2% probiotic.

* * * * *